Jan. 13, 1925.

F. A. LUNDQUIST

1,523,380

CONNECTER SWITCH AND BANK CONTACT

Original Filed Oct. 22, 1920  12 Sheets-Sheet 1

INVENTOR.
FRANK A. LUNDQUIST.
By Casper L. Redfield
ATTY.

Jan. 13, 1925.

F. A. LUNDQUIST

1,523,380

CONNECTER SWITCH AND BANK CONTACT

Original Filed Oct. 22, 1920    12 Sheets-Sheet 3

INVENTOR
FRANK A. LUNDQUIST.
By Casper L. Redfield
ATTY.

Jan. 13, 1925.

F. A. LUNDQUIST 1,523,380

CONNECTER SWITCH AND BANK CONTACT

Original Filed Oct. 22, 1920   12 Sheets-Sheet 8

INVENTOR.
FRANK A. LUNDQUIST.
By Casper L. Redfield
ATTY.

Jan. 13, 1925.

F. A. LUNDQUIST

1,523,380

CONNECTER SWITCH AND BANK CONTACT

Original Filed Oct. 22, 1920   12 Sheets-Sheet 9

INVENTOR
FRANK A. LUNDQUIST.
By Casper L. Redfield
ATTY.

Jan. 13, 1925.
F. A. LUNDQUIST
1,523,380
CONNECTER SWITCH AND BANK CONTACT
Original Filed Oct. 22, 1920    12 Sheets-Sheet 11

INVENTOR
FRANK A. LUNDQUIST.
By Casper L. Redfield
ATTYS.

Patented Jan. 13, 1925.

1,523,380

UNITED STATES PATENT OFFICE.

FRANK A. LUNDQUIST, OF CHICAGO, ILLINOIS, ASSIGNOR, BY MESNE ASSIGNMENTS, TO HENRY S. CONRAD, TRUSTEE.

CONNECTER SWITCH AND BANK CONTACT.

Application filed October 22, 1920, Serial No. 418,714. Renewed October 10, 1924.

*To all whom it may concern:*

Be it known that I, FRANK A. LUNDQUIST, a citizen of the United States of America, and a resident of Chicago, county of Cook, and State of Illinois, have invented certain new and useful Improvements in Connecter Switches and Bank Contacts, of which the following is a specification.

My invention relates to connecter switches and bank contacts in automatic telephone exchanges, and has for its object improvements in such devices. Connecters are controlled by electric circuits which extend from local stations thru other switches to the connecters, and the function of a connecter is to make electrical connections to other local stations. While electric circuits are involved in the operations of a connecter, the present invention relates to the mechanical construction and operation, and circuits are referred to only as a help in understanding these mechanical things.

In the accompanying drawings—

Figure 10:
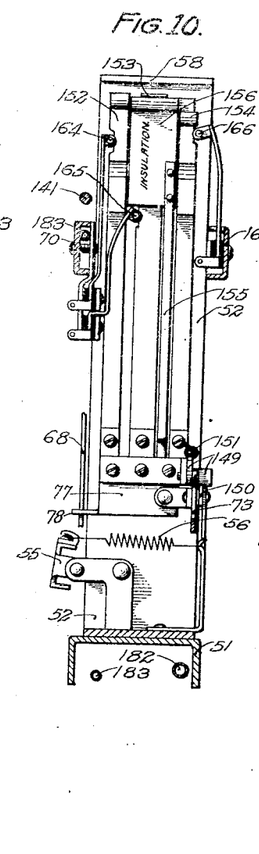
Fig. 10 is a section on line 10—10 of Fig. 1.
Figure 11:
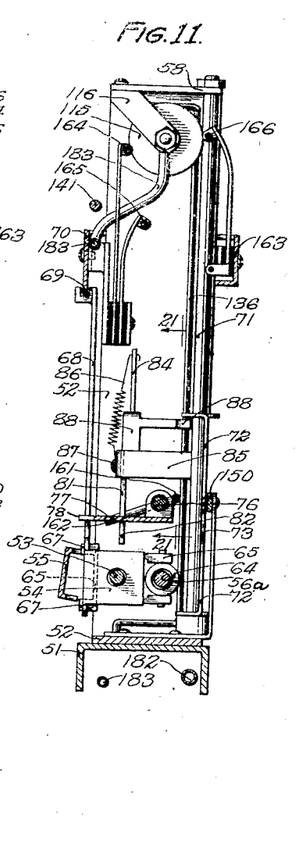
Fig. 11 is a section on line 11—11 of Fig. 1.

The frame work of the connecter consists of a channel iron base 51 and a flat bar 52 bent up as shown in the side elevations. Secured in the lower part of the frame 52 is a horizontal bar 53, and slidably mounted on this bar is a carriage 54. (Figs. 6, 11, 17 and 24.) Pivotally supported on the frame 52 is a ratchet bar 55 which is in the form of a channel and is adjacent to and parallel with the guide bar 53. A spring 56 normally holds the ratchet bar 55 in the position shown in Fig. 10.

A round bent rod 56$^a$ has one end secured at 57 (Figs. 1, 12 and 17) to the lower part of the frame 52, and the other end secured at 58 to the upper part of the frame. The lower part of this rod is bent horizontal and parallel with the adjacent rod 53, while the upper part is bent vertical and parallel with and adjacent to a motor 59. The motor 59 consists of an outer tube mounted to slide telescopically on an inner tube 60 which is supported upon a convenient bracket 61.

Figures 3, 4, 5:
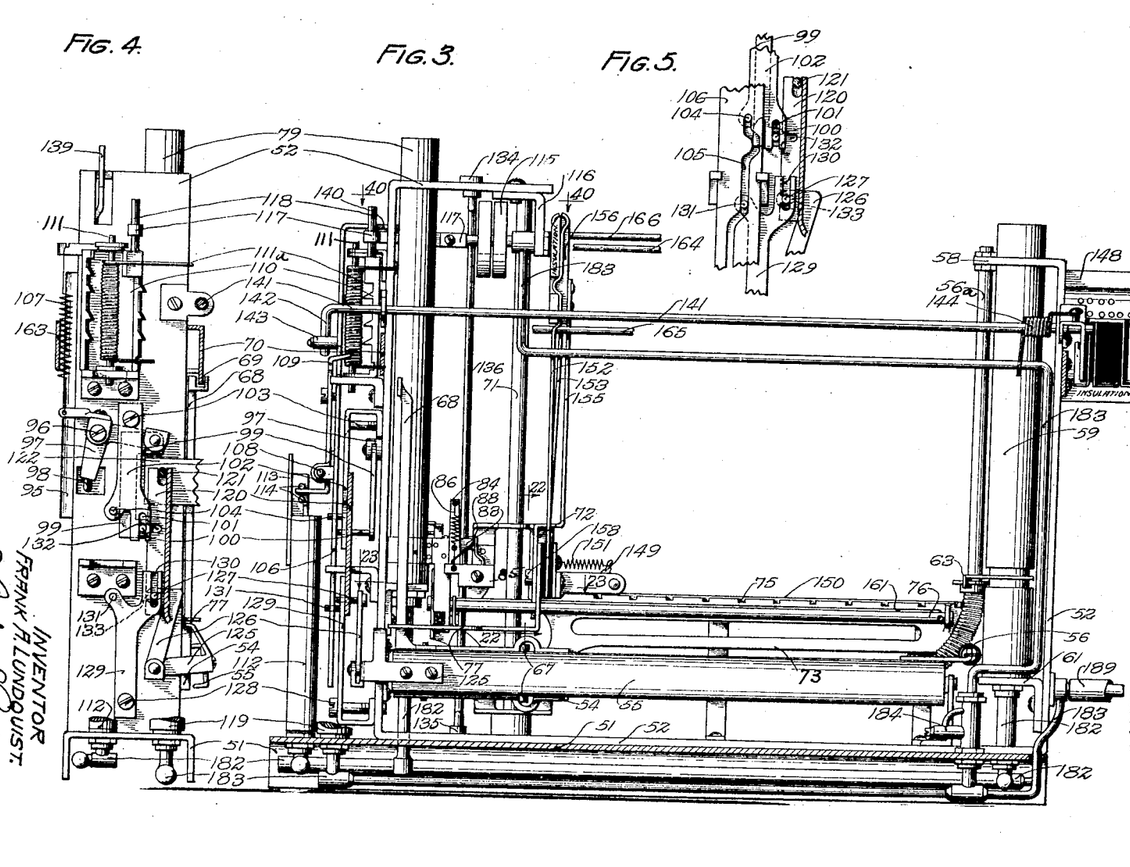
Fig. 3 is an elevation of the right hand side, with parts broken away.
Fig. 4 is a rear elevation with parts broken away.
Fig. 5 is a detail corresponding to Fig. 4 but showing some parts omitted in Fig. 4.
Figure 17:
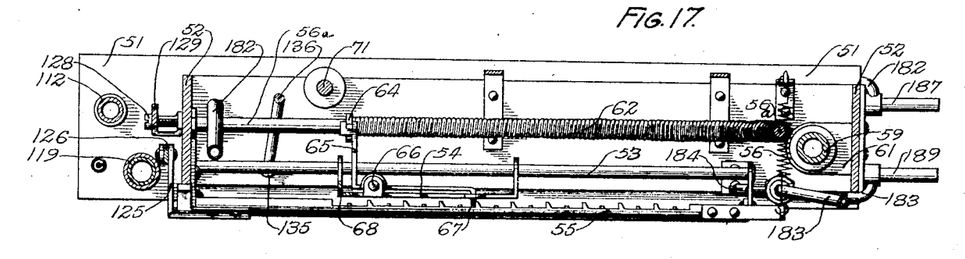
Fig. 17 is a section on line 17—17 of Fig. 13.

Mounted to slide easily upon the rod 56$^a$ is a coil of wire 62 which has its ends secured to collars 63 and 64 which are also slidable on the rod 56$^a$. The collar 63 is connected to motor 59 so that when said motor rises the coil will slide on rod 56$^a$. The collar 64 is connected to one arm of a lever 65 pivoted at 66 to the carriage 54. The other end of the lever 65 terminates in a double toothed pawl 67 which projects thru an opening in the carriage 54 and is arranged to engage the teeth of the ratchet bar 55. The coil 62 constitutes a flexible connection between the motor 59 and the pawl 67, and one which serves equally well in both push and pull. When the motor 59 is at its lowest position, there is a push on the coil 62 which acts to move the carriage 54 to the left as seen in Figs. 3 and 17, and to press upon the lever 65 so as to hold the pawl 67 clear of the teeth on bar 55. When the motor 59 rises, there is a pull on the coil which acts to move the carriage 54 to the right, and also to throw the pawl 67 into the teeth of bar 55 to arrest such movement.

Figures 6, 7, 8:
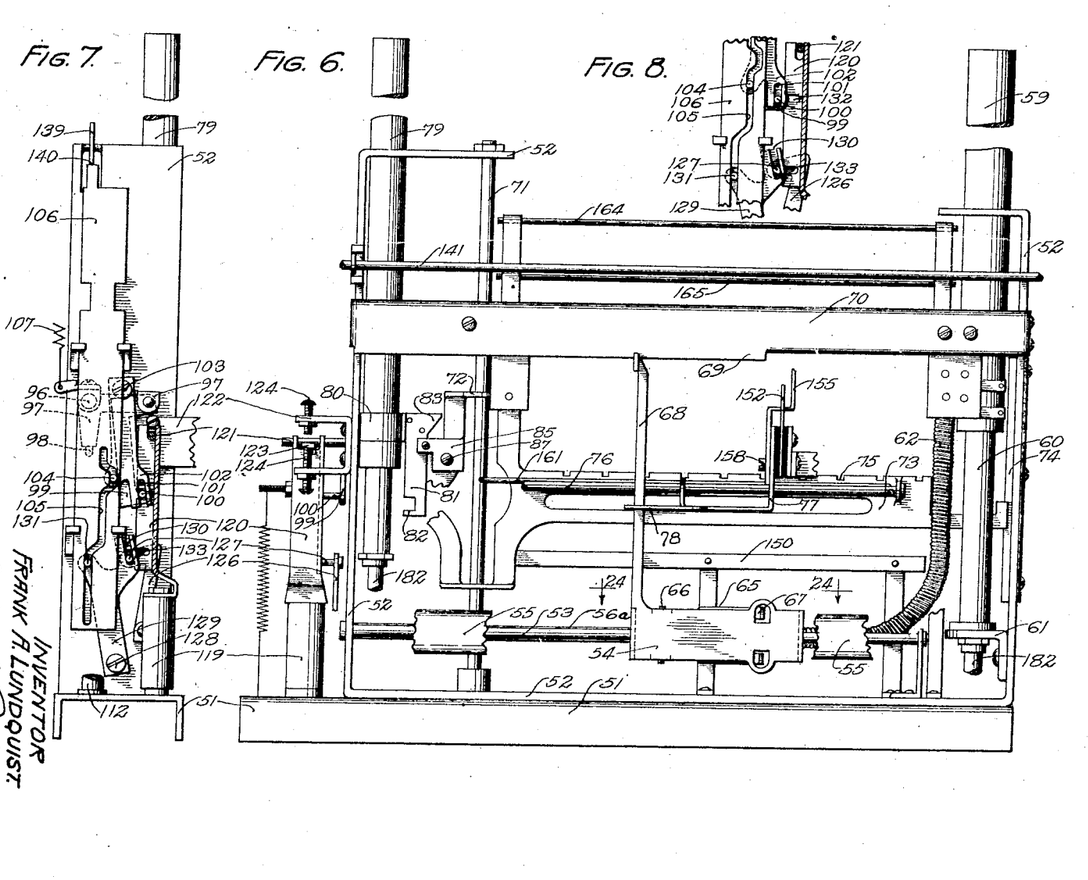
Fig. 6 corresponds to Fig. 3 but with parts in operated position and some parts omitted.
Fig. 7 corresponds in a similar way to Fig. 4.
Fig. 8 is a detail corresponding to part of Fig. 7 but showing parts moved further.
Figures 13, 14:
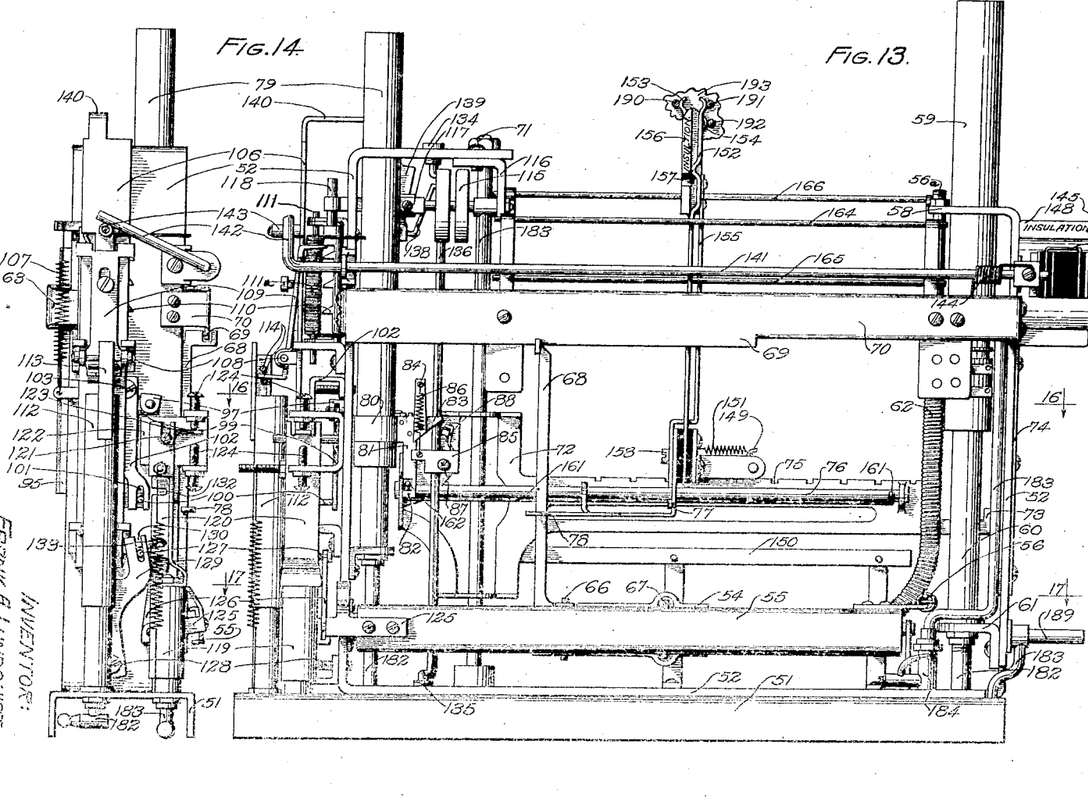
Fig. 13 is an elevation corresponding to Fig. 3 but with the parts in final position and the contact makers engaging a pair of bank wires.
Fig. 14 is a front elevation of Fig. 13.

On the carriage 54 is a vertical arm 68 which engages and slides upon a guide flange 69 on tie 70 which connects the upright parts of the frame 52. (Figs. 6 and 13.) The arm 68 serves to keep the carriage 54 from turning on its guide rod 53, and also serves to move another carriage as will be described later.

Secured to the upper and lower parts of the frame 52 is a vertical guide rod 71 upon which is movable a carriage 72. The carriage 72 has a horizontal arm 73 which engages a vertical guide 74 on the frame 52, and on the upper edge of arm 73 are ratchet teeth 75. Secured to brackets on the carriage 72 is a horizontal guide rod 76, and on this rod is a third carriage 77 which has an arm 78 that engages and slides upon the arm 68 of carriage 54.

Secured to the motor 79 is a bracket 80 to which is secured a plate 81 having a hook 82 at its lower end, a dog 83 at the side, and an arm 84 extending upward. On the carriage 72 is a bent arm 85, and from this arm a spring 86 extends to the upper end of arm 84. And pivoted at 87 on the arm 85 is a hook 88 which extends above the dog 83 and is normally held in position over said dog by a spring 188 shown in Figs. 20 and 21. These parts are so arranged that when the motor 79 rises, the spring 86 is expanded until the dog 83 engages the hook 88 to lift carriage 72. When the hook 88 is later released as will be later described, the motor 79 rises without moving the carriage, and the relative position of parts shift from position shown in Fig. 18 to that shown in Fig. 19. In this action the spring 86 is further expanded, thus maintaining an upward pull upon the carriage 72 without raising it.

Figure 1:
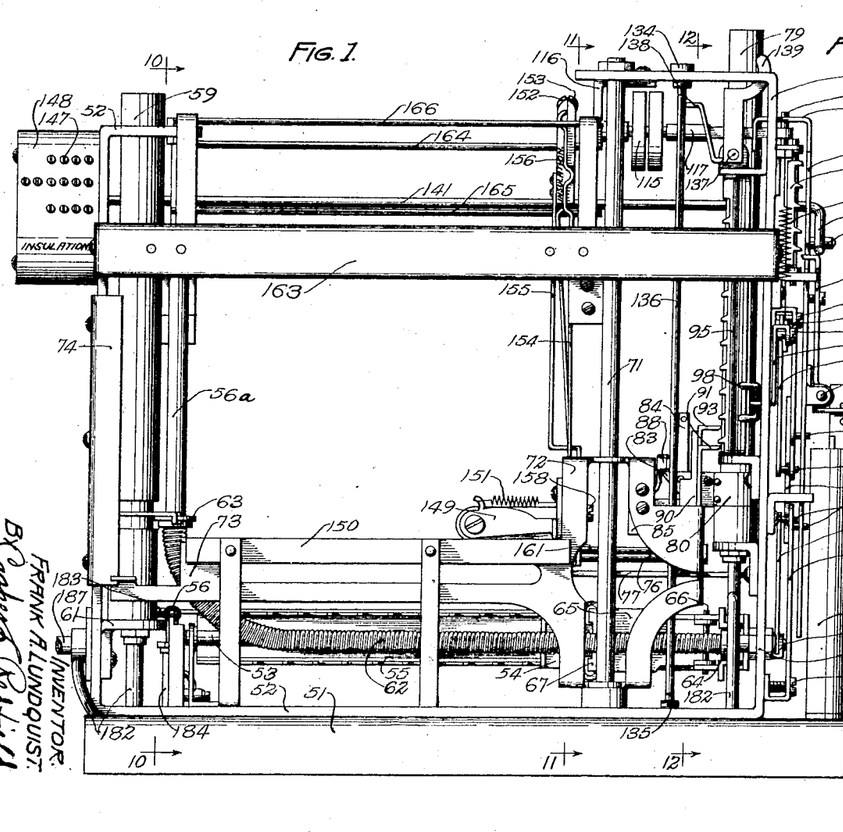
Fig. 1 is a side elevation, being a view of the left hand side of the connecter when the parts are in normal position.
Figure 2:
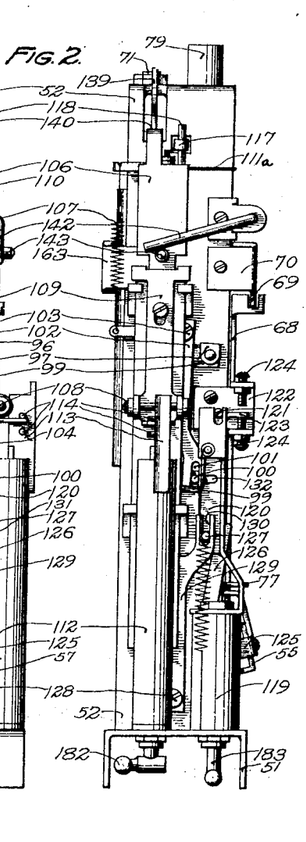
Fig. 2 is a front elevation.
Figure 12:
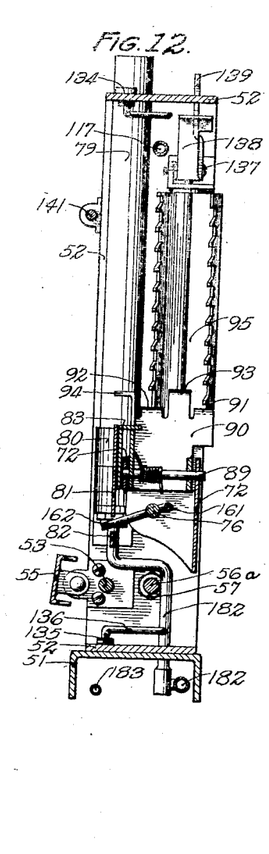
Fig. 12 is a section on line 12—12 of Fig. 1.
Figures 20, 35:
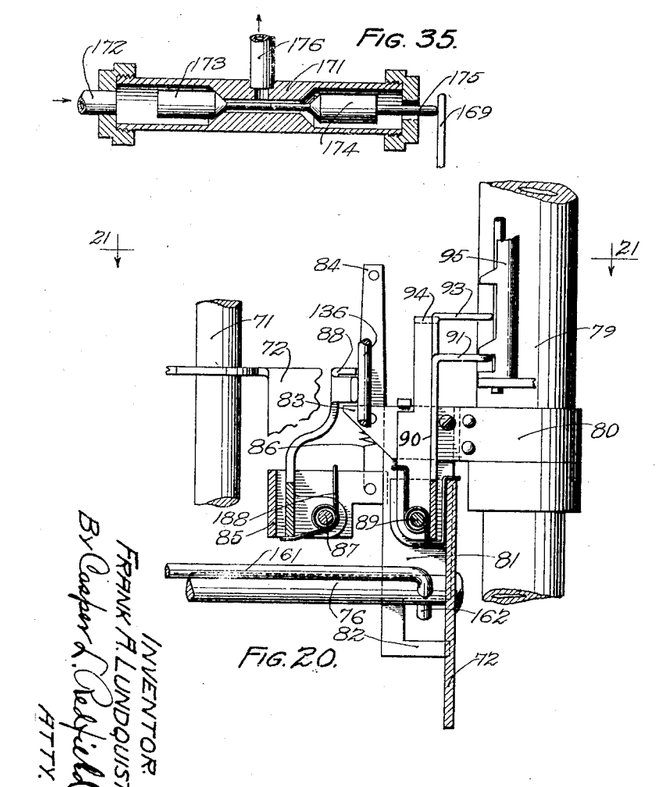
Fig. 20 is an enlarged detail of some of the parts shown in Fig. 1.
Fig. 35 is a section of the valve apparatus shown in Figs. 31, 33 and 34.
Figure 21:
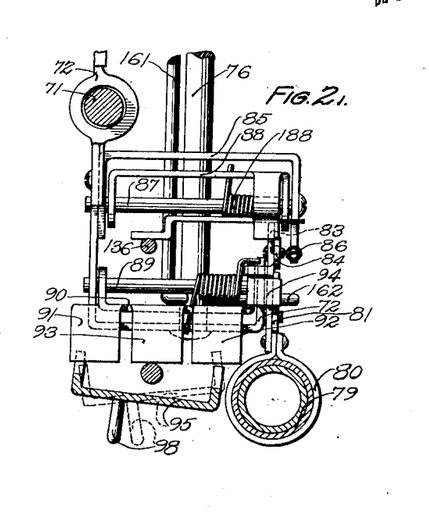
Fig. 21 is a section on line 21—21 of Fig. 20.

Pivoted on a pin 89 is a plate 90 having hooked arms 91, 92, 93 and 94 (Figs. 1, 12 and 20). Pivoted to brackets carried on the frame is a channel 95 having teeth cut on its flanges, which teeth are arranged to be engaged by the hooked arms 91 and 92 acting as pawls. When the channel 95 is vibrated on its pivots as will be described hereinafter, the carriage 72 is permitted to rise step by step under the action of motor 79.

Figure 16:
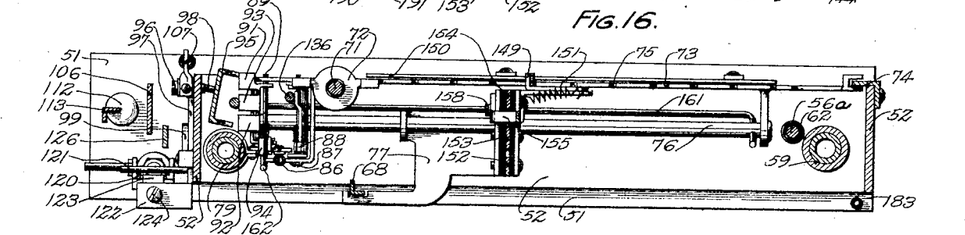
Fig. 16 is a section on line 16—16 of Fig. 13.

Pivoted at 96 (Figs. 1, 4 and 16) on the frame 52 is a bell crank lever 97 having one arm extending thru a hole in the frame and engaging a pin or lug 98 on the back of the channel 95. The horizontal arm of the bell crank 97 is connected to a link 99 which has at its lower end a pin 100. The pin 100 extends thru a slot 101 in the lower end of an arm or lever 102 which is pivoted at 103 to the frame. On the lower end of the arm 102 is a pin 104 which projects into a cam slot 105 in a plate 106 vertically movable in guides on the frame (Figs. 4, 5, 7 and 8). A spring 107 connected to the bell crank 97 holds parts 95, 97 and 99 normally in such a position that pin 100 is in the lower part of slot 101. When pin 100 is caused to reciprocate in slot 101 as will be described later, the channel 95 is vibrated on its pivots so that it furnishes an escapement with pawls 91 and 92 so that the carriage 72 may move upward under the action of motor 79.

Figure 15:
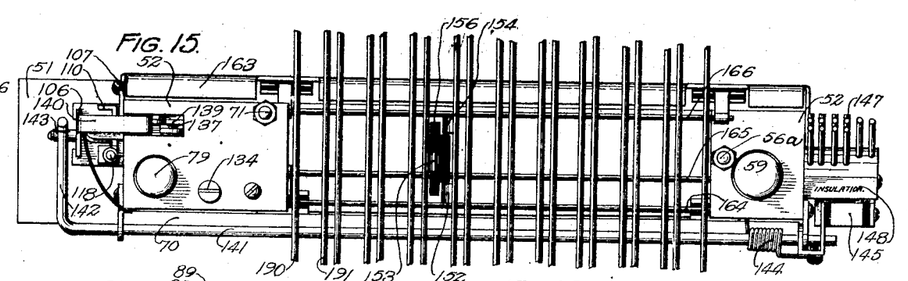
Fig. 15 is a plan with part of the bank wires shown above the connecter.
Figure 40:
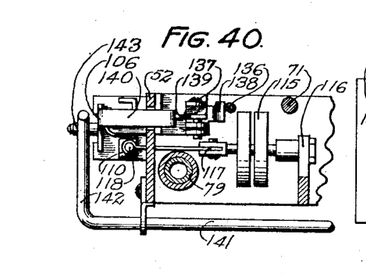
Fig. 40 is a section on line 40—40 of Fig. 3.

Pivoted at 108 on slide 106 is a bell crank 109 which has its vertical arm extending thru notches in the edges of slide 106 and engaging teeth on the flanges of a channel 110 pivoted on shaft 111 which is supported in brackets on the frame. Spring 111$^a$ on shaft 111 holds the channel 110 normally in the position shown in Figs. 15 and 40. Mounted upon the base 51 is a motor 112 having a projection 113 which carries pins 114 located on opposite sides of the horizontal arm of bell crank 109. When motor 112 rises it acts to lift slide 106, but such action turns bell crank 109 on its pivot so that the pawls on the upper end thereof engage the teeth on channel 110 to arrest such rise immediately after it starts.

Supported in the upper part of the apparatus is a sylphon 115, the same being a short stroke motor in the form of compound diaphragms. When compressed air is admitted to the interior of the sylphon it expands axially, and when the admitted air is exhausted the sylphon contracts to its normal position. The fixed part of the sylphon is attached to a bracket 116, and the movable end thereof has secured thereto a connecting rod 117 which extends to and is connected to a pin 118 on the channel 110. Expansion and contraction of the sylphon 115 vibrates channel 110 on its pivot so that motor 112 may raise the slide 106 step by step.

Adjacent to the motor 112 is another motor 119 which has on its top a standard 120 formed of sheet metal bent up into irregular form. The upper end of the standard 120 is guided on a pin 121 in a bracket 122 secured to the frame. The upper end of the standard has a lip 123 which projects between set screws 124. These set screws with lip 123 serve to limit the length of the strokes of the motor 119 when air is admitted to and exhausted therefrom.

On one end of the ratchet bar 55 is an arm 125 (Fig. 3, 4 and 17) which extends around the adjacent part of the frame 52 and has connected thereto a pivoted link 126 having a pin 127 in its upper end. Pivoted at 128 on the frame is a lever 129 having its upper end forked. In one branch of this fork is a slot 130 which embraces the pin 127, and in the other branch of the fork is a pin 131 which projects into the cam slot 105 of plate 106.

In the standard 120 is a slot 132 adjacent to the pin 100 in link 99, and adjacent to the pin 127 is another slot 133. When the plate 106 is at its lowest position, the cam slot 105 acting on pin 131 swings the lever 129 so as to keep pin 127 in slot 133 (Figs 4 and 5.) In this position reciprocations of motor 119 vibrate ratchet bar 55 on its pivots so that motor 59 may move carriage 54 step by step. While this is occurring, cam slot 105 acting on pin 104 keeps pin 100 clear of slot 132. But when the slide 106 moves upward one step, the cam slot acting on pin 131 withdraws pin 127 from slot 133, and acting on pin 104 forces pin 100 into slot 132. In this position, reciprocations of motor 119 act thru link 99, bell crank 97 and lug 98 to vibrate the ratchet 95 so as to permit the motor 79 to move carriage 72 upward step by step.

Figure 18:
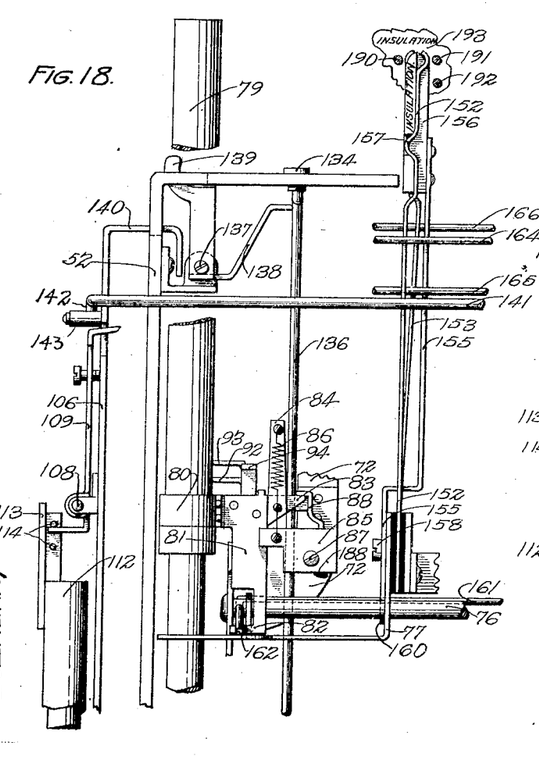
Fig. 18 is an enlarged detail corresponding to parts shown in Fig. 3.
Figure 19:
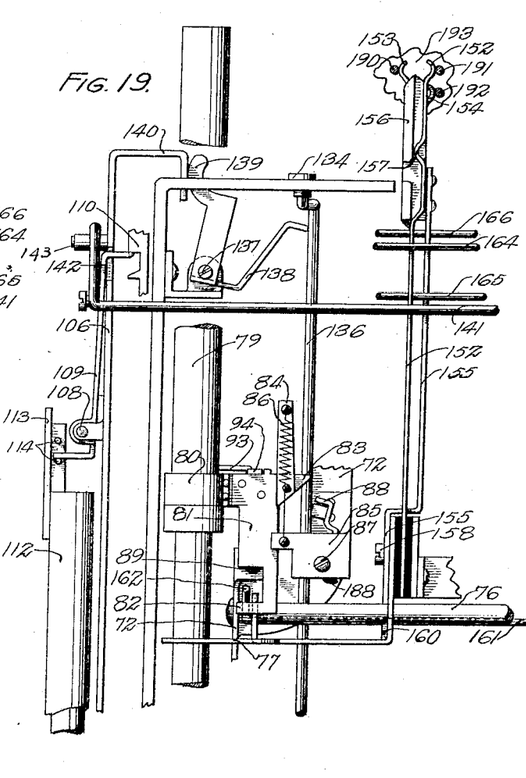
Fig. 19 represents the same parts in operated position.

Pivoted at 134 and 135 on the upper and lower parts of the frame 52 is a bail 136 which bears against an arm on the side of hook 88. Pivoted at 137 on a bracket secured in the upper part of the frame (Figs. 1, 18 and 19) is a lever having an arm 138 resting against bail 136 and an arm 139 in the path of an extension 140 on the upper end of slide 106. When the slide 106 rises to its third position, the contact between 140 and 139 moves the bail 136 on its pivots to release hook 88 from dog 83, as shown in Fig. 19.

Supported in the upper part of the mechanism is a horizontal shaft 141 which has an arm 142 on one end held in engagement with a pin 143 on slide 106 by the action of a spring 144 on said shaft. On the other end of the shaft 141 is a block 145 which carries a series of insulated brushes 146 designed to make electrical connections with certain fixed contacts 147 held in insulation 148 when the shaft 141 is turned by the rise of slide 106. These parts correspond to the ordinary side switch and need no particular description.

When the carriage 54 is moved laterally as previously described it moves carriage 77 on guide rod 76. When the carriage 72 is moved upward it carries carriage 77 with it. On carriage 77 is a pawl 149. When carriage 72 is at its lowest position, this pawl rests on a bar 150 supported in any convenient manner on the frame. But when the carriage 72 rises, spring 151 causes pawl 149 to engage the teeth 75 on arm 73 of carriage 72.

Figures 27, 28, 30:
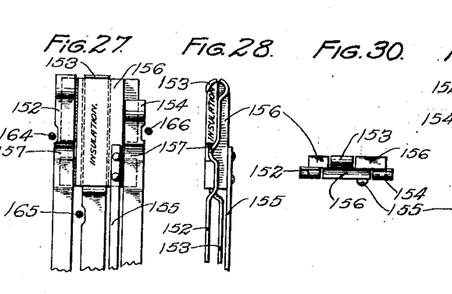
Figs. 27 to 30 are details of the contact makers.
Figures 29, 31:
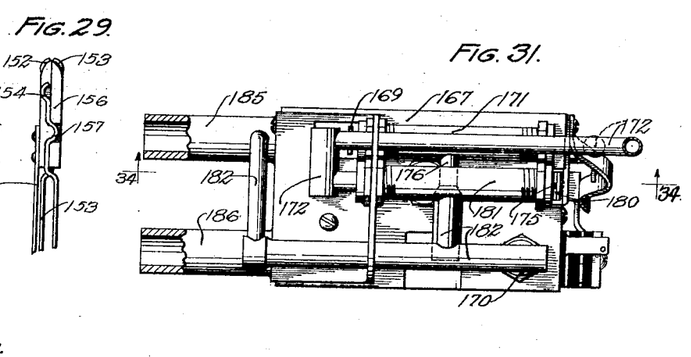
Fig. 31 is a plan of the electro-pneumatic and controlling apparatus.
Figure 32:
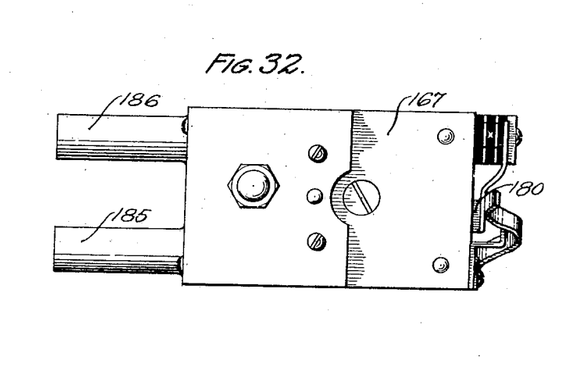
Fig. 32 is a bottom view of Fig. 31.
Figures 33, 34, 36:
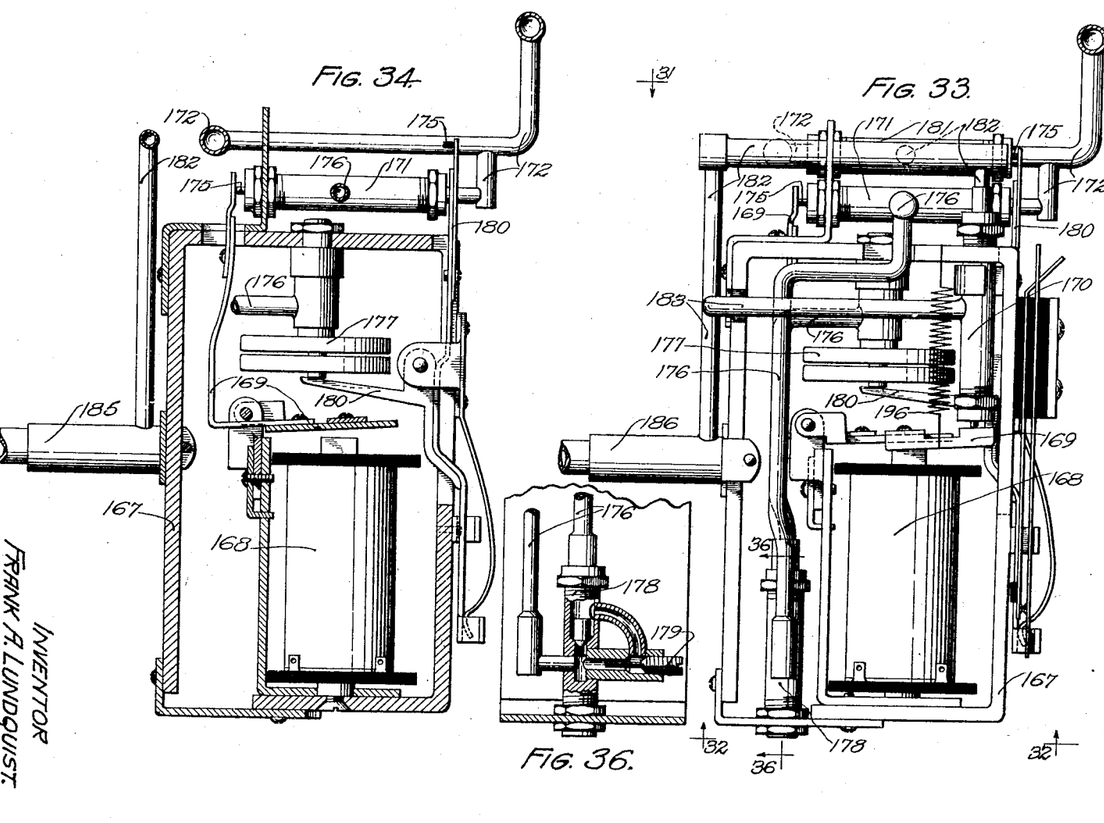
Fig. 33 is a side elevation of the same.
Fig. 34 is a section on line 34—34 of Fig. 31.
Fig. 36 is a sectional elevation of parts shown in Fig. 33.
Figures 37, 39:
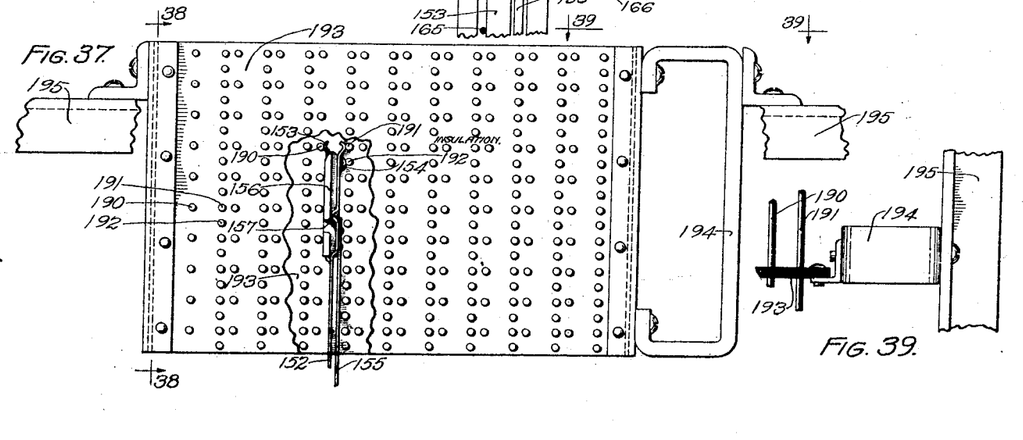
Fig. 37 is an end elevation of the bank contacts, parts being broken away to show contact makers in engagement with part of them.
Fig. 39 is a plan of part of Fig. 37.

Mounted upon carriage 77 are three contact makers 152, 153 and 154, insulated from each other and from the carriage. Slidably secured to the carriage 77 is a rod 155 which has its upper end secured to a block of insulation 156 associated with the contact making ends of said contact makers. The parts are so arranged that the contact makers 152 and 154 lie on one side of the block of insulation, and the contact maker 153 lies on the other side. The contact makers have cams 157 thereon near the contact making ends, and the block 156 has parts cut away opposite these cams as shown in Figs. 28 and 29. The parts are so arranged that when the rod 155 pulls the block 156 downward, the contact makers are spread so as to make electrical connections as shown in Fig. 37.

Figures 22, 23, 25, 26:
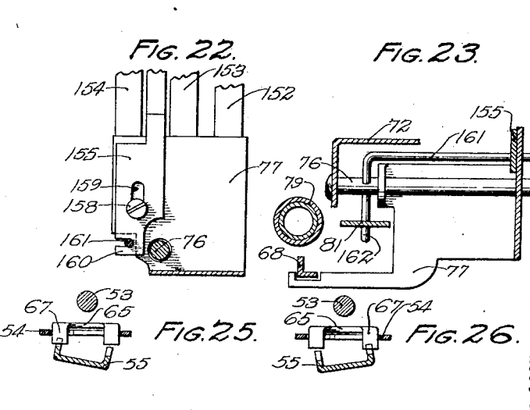
Figs. 22 and 23 are enlarged details, being sections on lines 22—22 and 23—23 of Fig. 3.
Figs. 25 and 26 are two positions of ratchet and pawl, the same being sections on line 25—25 of Fig. 24.
Figure 24:
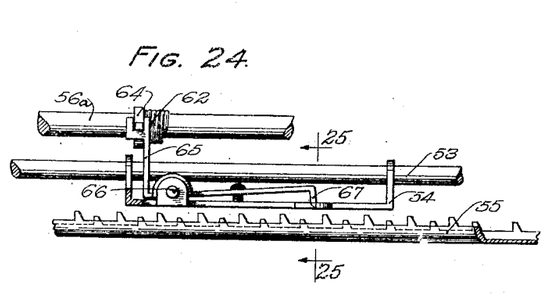
Fig. 24 is an enlarged detail of parts shown in Fig. 17.

The rod 155 is connected to the carriage by a screw 158 (Fig. 22) which runs thru a slot 159 to permit the rod 155 to move downward on the carriage 77. On the lower end of the rod 155 is a hook 160 which engages a bail 161 on the guide rod 76. At one end the bail 161 extends through the guide rod 76 and engages the hook 82 at 162 as shown in Figs. 12, 18 and 19. It will be evident that if the motor 79 moves upward after the hook 88 is released from dog 83, the hook 82 will act on the arm 162 to turn the rod 76 as a shaft and cause bail 161 to pull the rod 155 downward, thus causing the block 165 to spread the contact makers.

Insulatingly supported on ties 70 and 163 are certain standards which support electrical conductors 164, 165 and 166 designed to make electrical connections with contact makers 152, 153 and 154, respectively, when these contact makers are moved upward by the rising of the carriage 77. When the carriage 77 is at its lowest position, these conductors are opposite recesses cut in the edges of the contact makers, as shown in Fig. 27. It is only when the contact makers are moved upward that they engage said conductors.

Figure 41:
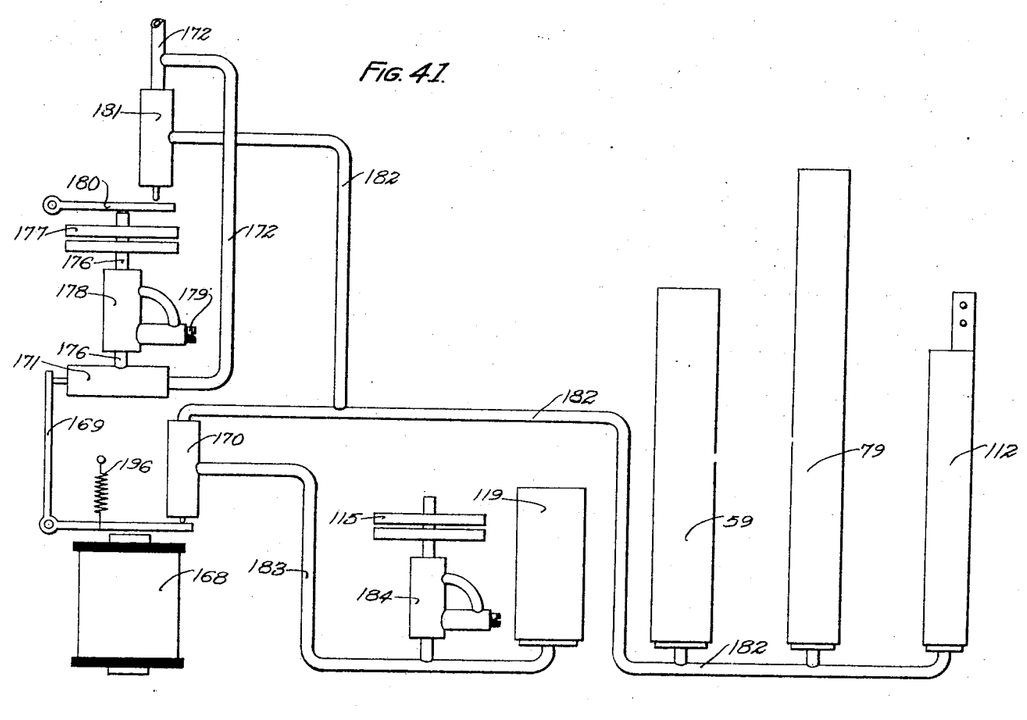
Fig. 41 is a diagram of the air connections to the different motors.

The apparatus shown in Figs. 31 to 34 is connected to the apparatus previously described by a pipe shown at the lower left hand corner of Fig. 1. This apparatus is supported in a frame 167 and consists of a magnet 168 and certain valves and other pneumatic devices by which air is conveyed to the different motors for their proper operation. Reference to the diagram in Fig. 41 will assist in understanding the following description.

The armature lever 169 controls two valves 170 and 171 constructed as shown in Fig. 35. In such a valve air enters through pipe 172 into a chamber containing a valve body 173 which is in the nature of a check valve normally held to its seat by the air pressure. In the other end of the casing 171 is another valve body 174. The two valve bodies have stems projecting toward each other and of such length that only one of said bodies can be on its seat at one time. The body 174 has a projecting pin 175 arranged to be engaged by the armature lever 169 or other lever for moving it. When the parts are in the position shown in Fig. 35 no air can flow through the valve, but when lever 169 is moved to shift the valve bodies air flows freely from pipe 172 to pipe 176. When the lever 169 is withdrawn, the bodies 173 and 174 return to normal position and air in pipe 176 is exhausted through opening around stem 175. The different valves in this apparatus are all like the one just described and will be designated by characters applied to the casings.

The pipe 176 leads to a sylphon 177, and in this pipe is a check valve apparatus 178 (Fig. 36) consisting of a valve body which permits a free flow of air towards the sylphon by causing the exhaust to flow through a by-pass controlled by a screw 179. The object of this check valve is to permit a quick operation of the sylphon when the valve 171 is opened, and to cause the return to be slow when the valve is closed.

When sylphon 177 is operated it moves lever 180 to open valve 181 and permit air to flow from the general supply pipe 172 through the pipe 182 to the valve 170 and to the motors 59, 79 and 112.

Figure 9:
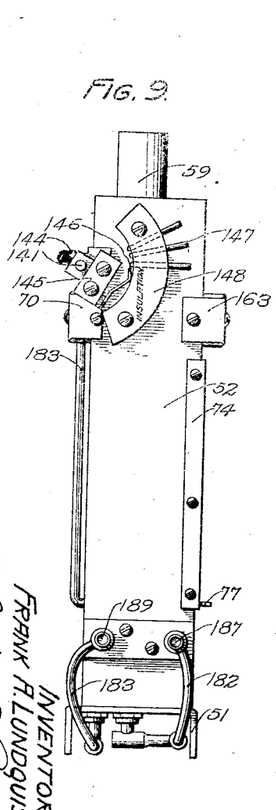
Fig. 9 is an elevation representing the left hand end of Fig. 1.

The valve 170 permits air to flow from pipe 182 through pipe 183 to the motor 119 and through a check valve 184 to the sylphon 115 previously described. The pipes shown in the connecter drawings are extensions of those shown in Figs. 31, 33 and 34, and are given the same numbers. For the purpose of easy connection and disconnection the pipes of Figs. 33 and 34 terminate in sockets 185 and 186 arranged to fit upon nipples 187 and 189 shown in Figs. 9 and 17.

The bank contacts (Figs. 37 and 38) consist of one hundred sets or groups of wires with three wires in each set or group. Taking one group in Fig. 37, wire 190 is designed to be engaged by a contact maker 153; wire 191 to be engaged by contact maker 152; and wire 192 by contact maker 154. These wires are supported at intervals by pieces of insulation 193 secured to brackets 194 on a frame work 195. Two of the wires of a set lead to a local station to be called, and the third wire is a private wire for preventing interfering electrical connection. The only thing involved in the present application is the mechanical operation of making connections to these wires.

In operation other apparatus completes a circuit thru magnet 168, which circuit extends to a calling station provided with devices for breaking and remaking the circuit. Such devices may be the ordinary calling device used in automatic telephone exchanges. In the normal position of the armature 169 the valve 170 is open and the valve 171 is closed. But no air reaches valve 170 at this time because valve 181 is normally closed. When the circuit is first made thru magnet 168, the attraction of armature lever 169 opens valve 171 and permits valve 170 to close. This permits air to flow from the supply pipe 172 to sylphon 177 which moves lever 180 to open valve 181 and permit air to flow to the previously closed valve 170 and to the motors 59, 79 and 112. The motor 59 begins to rise but is immediately arrested by the fact that the coil 62 is connected to the lever 65 and the pull of the motor on this coil acts to throw the pawl 67 into the teeth of bar 55. The motor 79 also begins to rise but is immediately arrested by the dog 83 engaging the hook 88 on the carriage 72, and the fact that the hooked arm 91 on said carriage is normally in engagement with the channel 95. And the motor 112 also begins to rise but is immediately arrested by the pawls on bell crank 109 engaging teeth of the channel 110.

From the foregoing it will be seen that making and holding a circuit thru the magnet 168 results in putting air pressure on motors 59, 79 and 112 without permitting any of them to do any more than lock themselves against switch operating movements. It also brings air pressure to the closed valve 170 where it is available for subsequent use.

The calling device at the calling station is arranged to break and remake, either directly or indirectly, the circuit thru the magnet 168, and to do this a series of times in rapid succession. As far as anything here is concerned, these breaks and remakes might be performed manually, but the use of a mechanical appliance for the purpose insures that they be made uniformly at a predetermined speed. The break of the circuit permits armature lever 169 to fall back and valve 171 to close, but the immediate remake of the circuit again opens valve 171. The screw 179 of device 178 is so adjusted that air cannot be exhausted from sylphon 177 in the brief interval in which valve 171 is closed, with the result that the sylphon is unaffected by the vibrations of the armature 169 and a steady pressure of air is maintained on motors 59, 79 and 112 during such operations.

The break of the circuit thru the magnet 168 permits retracting spring 196 to open valve 170 so that air may flow to sylphon 115 and motor 119, and the repetition of the break and remake causes this flow to be by pulsations. The pulsations flowing thru valve 170 to pipe 183 correspond exactly to the pulsations flowing thru valve 171 to pipe 176, but the two sets of pulsations alternate with each other because one valve is opened when the armature is attracted and the other is opened when it is retracted. The motor 119 is arranged to respond to the pulsations flowing to it, and it makes as many reciprocations as there are pulsations due to vibrations of the armature. But in the branch leading to the sylphon 115 there is the check valve 184 which permits the sylphon to act quickly but to retract slowly. As a consequence, this sylphon remains expanded during the pulsations but retracts as soon as the pulsations cease. The difference between sylphon 115 and sylphon 177 is that 115 retracts at the end of each series of pulsations while 177 remains expanded continuously and only retracts when the circuit thru magnet 168 remains broken for a considerable interval of time.

At the time when the first series of impulses is sent thru magnet 168, air pressure is on pipe 182 and motor 119 responds to the pulsations in pipe 183. At this time pin 127 of link 126 (Figs. 3 to 8) is in slot 133 with the result that the reciprocations of motor 119 vibrate bar 55 on its pivots so that the teeth thereon will co-operate with the pawls 67 to form an escapement and permit the carriage 54 to be moved by the motor 59. The length of the carriage movement is determined by the number of pulsations, and each step of the escapement corresponds to the distance between one vertical row of groups contact wires 190, 191—192 and the next adjacent row.

At the termination of the first series of impulses the valve 170 is left closed and motor 119 and sylphon 115 return to normal position. The contraction of sylphon 115 turns the channel 110 on its pivots and permits slide 106 to rise one step under the action of motor 112. This step causes a cam in slot 105 to act on pin 104 so as to swing lever 102 on its pivot and move pin 100 into slot 132. At the same time another cam in slot 105 acts on pin 131 to swing lever 129 so as to remove pin 127 from slot 133. This position is shown in Fig. 7.

When the next series of impulses flow thru magnet 168 they again cause pulsations in pipe 183 to expand sylphon 115 and reciprocate motor 119. The pawls on the upper end of the bell crank 109 are so related to the teeth on channel 110 that the amount of escapement due to the expansion of the sylphon 115 is very small and without effect upon the apparatus, the real escape movement being at the contraction of the sylphon. With the shift of the pins 100 and 127 as described, the new reciprocations of the motor 119 turn bell crank 97 (Fig. 4) on its pivot 96 to vibrate channel 95 and thereby permit carriage 72 to rise step by step under the action of motor 79. The length of each step corresponds to the distance between one group of wires in Fig. 37 and the next group above it. Consequently this last escapement results in the contact makers being moved upward adjacent to that particular vertical row of contacts which was selected by the previous escapement.

At the termination of the second series of impulses the motor 119 and sylphon 115 return to normal position as before. This second contraction of the sylphon turns channel 110 as before and permits slide 106 to rise another step under action of motor 112. This second step brings the extension 140 of slide 106 against the arm 139 to cause arm 138 to move bail 136 so as to release hook 88 from dog 83. When this occurs the motor 79 is released to move upward while the carriage 72 is restrained from such upward movement by one of the hooks or pawls 91 or 92 engaging a tooth of the channel 95. This movement of the motor 79 with respect to the carriage 72 causes the hook 82 to engage the extension 162 of bail 161 and turn said bail so as to cause a downward pull on rod 155. This downward pull moves the block 156 over the cams 157 on the contact makers and spreads said contact makers to force them into engagement with adjacent contact wires as shown in Fig. 37.

From the foregoing it will be seen that each time the circuit is made thru magnet 168 and stands for an appreciable time, the slide 106 rises one step under the action of motor 112. And each time the slide 106 rises it turns the shaft 141 a short distance. Each rise so far described of the slide has resulted in a movement of the contact makers first in one direction, second in a direction perpendicular to the first direction, and third by the spreading of the contact makers in a direction parallel with the first direction. It will be evident that if the slide 106 is given more upward movements the only result will be to turn shaft 141 and consequently to shift the side switch apparatus step by step.

Figure 38:
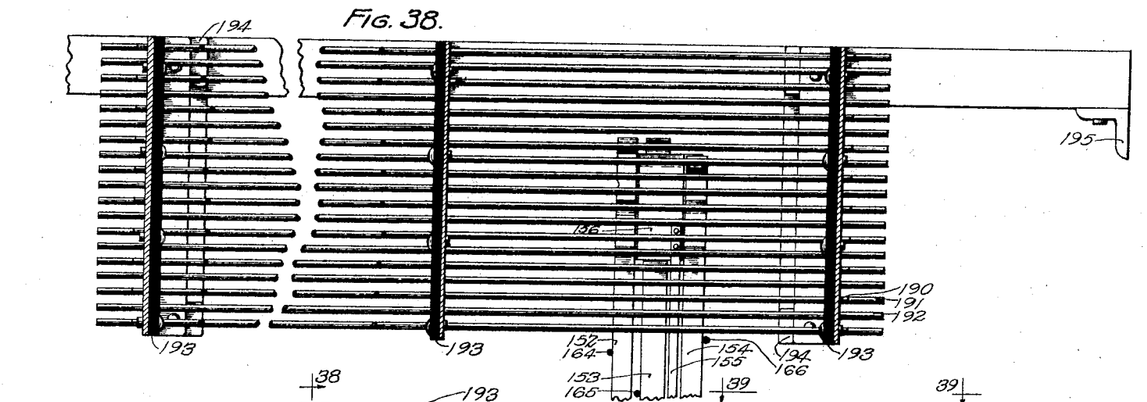
Fig. 38 is a section on line 38—38 of Fig. 37.

The operations described of the switching mechanism are those which extend a talking circuit to a called subscriber by making connections with wires shown in Figs. 37 and 38. During the time talking is carried on, the circuit is maintained through magnet 168, with the result that the parts stand in the position to which they had been moved. Upon termination of conversation, the circuit is broken through this magnet, and its armature lever 169 returns to its retracted position. This permits valve 171 to close with the result that air is exhausted from sylphon 177. This in turn permits valve 181 to close. As all motors, other than the previously exhausted 177, receive air through this valve, it will be evident that a closure of this valve exhausts air from all motors. This permits the parts to return to normal position in the reverse order to their advance.

What I claim is:

1. In a switching mechanism, a carriage, a motor arranged to move the carriage in one direction and a second motor arranged to move it in a second direction, an escapement associated with each motor and serving to restrain it, a third motor, and means for connecting said third motor to said escapements in succession so that said carriage may be moved by its motors.

2. In a switching mechanism, a carriage, pneumatic motors arranged to move said carriage in two directions, escapements arranged to restrain said motors when air pressure is applied to them, a third motor serving to operate said escapements so that the previously mentioned motors may move said carriage, and means for connecting the third motor and disconnecting it from said escapements.

3. In a switching mechanism, the combination with a carriage, motors for moving said carriage in different directions, a control motor, and a source of air pressure for operating said motors, of escapements for restraining said motors from operation, a magnet and devices so arranged that upon a current flowing through said magnet air pressure will be applied to all of said motors, and means controlled through said magnet for operating said escapements.

4. In a switching mechanism, contact makers, a pneumatic motor for moving the contact makers in one direction, an escapement for permitting the motor to advance step by step, a second pneumatic motor for moving the contact makers in a second direction, an escapement for permitting the second motor to advance step by step, a third pneumatic motor for operating said escapements, and means for shifting the connection of the third motor from one escapement to the other.

5. Contact makers, a pneumatic motor, an escapement for permitting the motor to move the contact makers step by step, a second pneumatic motor for moving the contact makers in a second direction, a second escapement for permitting the second motor to advance step by step, and a third pneumatic motor arranged to operate said escapements in succession.

6. Contact makers, pneumatic motors serving to move said contact makers in directions perpendicular to each other, an escapement for each motor, a third pneumatic motor arranged to control said escapements successively, and eletrical means for controlling said third motor.

7. In a switching mechanism, contact makers, pneumatic motors for moving them in directions perpendicular to each other, means for admiting compressed air simultaneously to both motors, restraining devices for holding said motors, a third motor arranged to make a predetermined number of reciprocations, and means for connecting said third motor first to one holding device and later to the other holding device whereby said holding devices are released so that the first named motors may move the contact makers step by step.

8. In a switching mechanism, contact makers, automatic means for putting a strain upon said mechanism to move the contact makers in directions perpendicular to each other, an escapement associated with each movement and serving to restrain the same, a motor for operating said escapements, and means for connecting said motor first to one escapement and then to the other so that said contact makers may be moved step by step successively in the two directions.

9. A series of sets of passive contacts, a corresponding set of contact makers, a carriage upon which the contact makers are mounted, a motor for moving said carriage so as to move the contact makers adjacent to the passive contacts, an escapement arranged to cause the carriage movement to be step by a step to correspond to the distance apart of successive sets of passive contacts, means for permitting the motor to move independent of the carriage movement, and means by which such independent movement causes the contact makers to spread outwards to engage the passive contacts to which they are adjacent at the time.

10. The combination with a series of sets of passive contacts, and a corresponding set of contact makers, of a motor arranged to move the contact makers step by step adjacent to successive sets of passive contacts, and means by which upon the termination of such step by step movement said motor spreads the contact makers laterally into engagement with the passive contacts to which they are adjacent.

11. The combination with a row of sets of passive contacts, and a corresponding set of contact makers, of a motor for moving the contact makers along a path adjacent to the row, an escapement by which such movement is step by step, and automatic means determined by an arrest of the escapement for spreading the contact makers laterally to engagement with a set of passive contacts.

12. The combination with a row of sets of passive contacts, and a set of co-operating contact makers, a motor for advancing the contact makers along a path adjacent to the row, means for arresting said contact makers when adjacent to a predetermined set of passive contact makers, and means by which a further movement of the motor after such arrest serves to spread the contact makers laterally into engagement with the adjacent set of passive contacts.

13. A series of sets of passive contacts arranged in a double row, a set of co-operating contact makers arranged to be moved along the space between the rows which form the double row, means for so moving the contact makers and arresting them adjacent to a set of passive contacts, and means for spreading the arrested contact makers laterally into engagement with the adjacent passive contacts.

14. A series of sets of passive contacts arranged in a double row, a set of co-operating contacts arranged to be moved in the space between the rows which form the double row, a carriage upon which the contact makers are mounted, a motor serving to move the carriage, means for arresting the carriage movement and permitting the motor to move after such arrest, and means by which such additional movement of the motor serves to spread the contact makers laterally into engagement with the adjacent set of passive contacts.

15. The combination with a carriage, a motor for moving it, and a releasable connection between the motor and the carriage, of contact makers moved by movement of the carriage, and means by which upon release of said connection the motor will spread the contact makers independent of the carriage.

16. The combination with a carriage, a motor for moving it, and a releasable connection between the motor and the carriage, of contact makers secured to the carriage, and means by which upon release of said connection the motor will spread the contact makers laterally with respect to the movement of the carriage.

17. The combination with contact makers, and a motor for moving them, of means by which one part of the motor movement serves to move the contact makers in one direction and another part of the motor movement serves to spread them in another direction.

18. The combination with a series of sets of passive contacts, a co-operating set of contact makers, and a motor, of means by which said motor first operates to move the contact makers to a position adjacent to a predetermined set of passive contacts and then operates to spread them laterally to engagement with the adjacent passive contacts.

19. The combination with a series of sets of passive contacts, a co-operating set of contact makers, and a pneumatic motor for moving the contact makers, of an escapement arranged to cause the motor movement to be step by step, a releasable connection between motor and contact makers, and means by which upon the release of such connection the motor operates to move the contact makers in a direction different from the previous direction and into engagement with a set of passive contacts.

20. The combination with contact makers, and a pneumatic motor for moving them, of means by which one part of the motor movement serves to move the contact makers in one direction and another part of the motor movement in the same direction serves to move the contact makers in another direction.

21. The combination with a carriage, a pneumatic motor for moving it, and a releasable connection between the motor and the carriage, of contact makers moved by movement of the carriage, and means by which upon release of said connection the motor will move the contact makers independent of the carriage.

22. In a switching mechanism, a carriage, motors arranged to move said carriage in two directions, escapements arranged to restrain said motors, a third motor serving to operate said escapements so that the previously mentioned motors may move said carriage, and means for connecting the third motor and disconnecting it from said escapements.

23. In a switching mechanism, the combination with a carriage, motors for moving said carriage in different directions, means for operating said motors, of escapements for restraining said motors from operation, a magnet, a third motor and means controlled through said magnet for operating said third motor to operate said escapements successively.

24. In a switching mechanism, contact makers, a motor for moving the contact makers in one direction, an escapement for permitting the motor to advance step by step, a second motor for moving the contact makers in a second direction, an escapement for permitting the second motor to advance step by step, a third motor for operating said escapements, and means for shifting the connection of the third motor from one escapement to the other.

25. Contact makers, a motor, an escapement for permitting the motor to move the contact makers step by step, a second motor for moving the contact makers in a second direction, a second escapement for permitting the second motor to advance step by step, and a third motor arranged to operate said escapements in succession.

26. Contact makers, motors serving to move said contact makers in directions perpendicular to each other, an escapement for each motor, a third motor arranged to control said escapements successively, and electrical means for controlling said third motor.

FRANK A. LUNDQUIST.